United States Patent [19]
Yamazaki et al.

[11] Patent Number: 5,892,562
[45] Date of Patent: Apr. 6, 1999

[54] LIQUID CRYSTAL ELECTRO-OPTIC DEVICE

[75] Inventors: Shunpei Yamazaki, Tokyo; Takeshi Nishi; Rumo Satake, both of Kanagawa, all of Japan

[73] Assignee: Semiconductor Energy Laboratory Co., Ltd., Kanagawa-ken, Japan

[21] Appl. No.: 770,703

[22] Filed: Dec. 19, 1996

[30] Foreign Application Priority Data

Dec. 20, 1995 [JP] Japan ..................................... 7-349670

[51] Int. Cl.$^6$ .................................................. G02F 1/1343
[52] U.S. Cl. ........................................... 349/141; 349/143
[58] Field of Search ............................. 349/46, 142, 143, 349/43, 151, 141; 345/206

[56] References Cited

U.S. PATENT DOCUMENTS

| | | | |
|---|---|---|---|
| 4,826,297 | 5/1989 | Kubo et al. | 349/151 |
| 5,148,301 | 9/1992 | Sawatsubashi et al. | 349/151 |
| 5,283,675 | 2/1994 | Ooi et al. | 349/143 |
| 5,313,562 | 5/1994 | Wiltshire | 349/139 |
| 5,341,012 | 8/1994 | Misawa et al. | 349/151 |
| 5,408,345 | 4/1995 | Mitsui et al. | 349/143 |
| 5,434,433 | 7/1995 | Takasu et al. | 349/43 |
| 5,526,149 | 6/1996 | Kanbe et al. | 349/143 |
| 5,786,876 | 7/1998 | Ota et al. | 349/143 |
| 5,801,802 | 9/1998 | Inoue et al. | 349/129 |

FOREIGN PATENT DOCUMENTS

| | | | |
|---|---|---|---|
| 3-107127 | 5/1991 | Japan | 349/151 |
| 4-116527 | 4/1992 | Japan | 349/143 |
| 6-160878 | 6/1994 | Japan . | |
| 6-214244 | 8/1994 | Japan . | |

*Primary Examiner*—Hung Xuan Dang
*Assistant Examiner*—Tiep H. Nguyen
*Attorney, Agent, or Firm*—Fish & Richardson P.C.

[57] ABSTRACT

In a horizontal electric field drive type liquid crystal electro-optic device wherein a liquid crystal material is driven by controlling the strength of an electric field parallel to a substrate, noncontinuity of the electric field strength around each pixel electrode is minimized and thereby the occurrence of flaws in the orientation of the liquid crystal material and dispersion in operation are reduced and a construction having improved display characteristics and a method of manufacturing the same are provided. In a horizontal electric field drive type liquid crystal electro-optic device wherein a gate electrode 403, a source electrode 407, a drain electrode 408, a semiconductor film 406 and a common electrode 404 are formed on a glass substrate and a liquid crystal material is driven by controlling the strength of an electric field substantially parallel to the glass substrate, the electrodes and the semiconductor film are made curved, for example semi-circular or semi-elliptical, in sectional profile. These curved sectional profiles can be formed by suitably selecting and combining various patterning and etching methods.

16 Claims, 4 Drawing Sheets driving circuit TFT — pixel TFT

LIQUID CRYSTAL ELECTRO-OPTIC DEVICE

BACKGROUND OF THE INVENTION

This invention relates to a liquid crystal electro-optic device having good electrical characteristics and angle of visibility characteristics with which a uniform display can be obtained over an entire screen.

As a method of widening the angle of visibility of a liquid crystal electro-optic device, a method wherein the direction of an electric field impressed on a liquid crystal is made substantially parallel to the surface of a substrate (hereinafter referred to as the super TFT method) is disclosed for example in Japanese Unexamined Patent Publication No. H.6-160878. In this case, an electric field is induced between a source electrode and a common electrode formed on one substrate, and the liquid crystal molecules are oriented in the direction of this electric field. Also, in Japanese Unexamined Patent Publication No. H.6-214244, the electric field impressed on the liquid crystal is made uniform by making the height of the electrodes the same as the cell thickness.

In this kind of liquid crystal electro-optic device, because switching is carried out with the long axes of the liquid crystal molecules kept parallel with the substrate, there is no change with angle of visibility in the optical characteristics of the liquid crystal. Consequently, there is less light leakage and contrast reduction and the like resulting from angle of visibility than with conventional TN and STN methods.

However, electrodes of the super TFT method conventionally used have been of a trapezoidal or rectangular structure, and the electric fields produced by these electrodes have been noncontinuous at vertices of the trapezoid or rectangle. Consequently, the electric field impressed on the liquid crystal has changed at certain points. That is, the electric field (electric flux density) has changed suddenly at the vertices of the trapezoid or rectangle. Consequently, switching of the liquid crystal by the electric field has not been carried out evenly in the cell, and a phenomenon of the time taken for the electric field to change from OFF to ON or from ON to OFF (these are respectively called the rise time and the fall time) varying within the cell has appeared.

This is a shortcoming which appears particularly markedly in the super TFT method, wherein a horizontal electric field is used to carry out liquid crystal driving.

The above-mentioned electric field noncontinuity will be explained with reference to FIG. 1. Here, for simplicity, the state of lines of electric force around the electrodes when a voltage is impressed across a pair of parallel electrodes (101, 102) each of a rectangular cross-section of height 'a' and width c formed with a spacing $2b$ between the electrodes on an insulating substrate (103) will be described. (For lines of electric form formed by electric changes, please refer to works on electromagnetism, for example 'Electromagnetism', Kazukiyo Nagata, published by Asakura, or 'Detailed Electromagnetic Practice', Goto and Yamazaki, Kyoritsu publishing.) Here, a direction parallel with the substrate and perpendicular to (the height direction of) the electrodes will b e made an x-axis and a direction perpendicular to the surface of the substrate will be made a y-axis. An origin will be so defined that the electrode surfaces parallel with the substrate are at y=0.

(1) In the region y<0 (−b<x<b), i.e. the region between the electrodes:

Because electric charge can be regarded as being distributed evenly over the electrode surfaces (104, 105), the lines of electric force (106) here are perpendicular to the electrodes (and parallel with the substrate).

(2) In the region y>0, i.e. the region above the electrodes:

Here, for the sake of simplicity, the state of the lines of electric force in the xy plane will be investigated.

Electric charge can be regarded as being distributed evenly over the electrode surfaces (107, 108).

For any point in the region y>0, the distance from the origin will be written r and the angle made by r and the x-axis will be written θ. Also, expressing z as a point in a complex plane using x, y and r, θ, the following relationship holds:

$$z=x+iy=r\exp(i\theta)$$

Here, to simplify the analysis, a value w will be defined as follows:

$$w=A\log z$$

(A is a constant of proportionality). If the real and imaginary parts of w are written u and v, then:

$$w=u+iv=A\log z$$

and $$u+iv=A\log\{r\exp(i\theta)\}=A\log r+iA\theta$$

is obtained. Therefore, $$u=A\log r,\ v=A\theta$$

Therefore, the set of curves expressed u=constant in the w plane are the set of curves r=constant in the xy plane, i.e. the set of concentric circles about the origin.

This result is illustrated in FIG. 1, from which it can be seen that the electric field distributions of the electrode side surfaces and the electrode top surfaces are different.

Here, as an example, the electric field between electrodes whose cross-sections are rectangular was shown, but the situation is the same between electrodes whose cross-sections are trapezoidal also. This is because since electric fields are formed perpendicular to the electrode surfaces the electric field of the taper parts and the electric field of the parts parallel with the substrate are noncontinuous at the electrode vertices.

This kind of noncontinuity of the electric field at the electrode vertices is a problem which cannot be ignored when making very small pixels. This is because when as a result of the adoption of very small pixels the number of electrodes increases and the interelectrode distance becomes small the noncontinuous electric field distributes at a high density.

As another method of solving the above-mentioned problem, an invention wherein in order to impress an electric field on the liquid crystal evenly in the cell thickness direction the height of the electrodes is made the same as the thickness of the cell has been proposed, in Japanese Unexamined Patent Publication No. H.6-214244. However, in making extremely tall electrodes, the following technological difficulties arise.

Firstly, when the height of an electrode is made as great as the cell thickness, a large difference in the horizontal direction electrode thickness tends to arise between the top and the base of the electrode. In the super TFT method, wherein the liquid crystal is driven with a horizontal electric field, a difference in the electrode thickness constitutes a difference in the interelectrode distance. Consequently, because the electric field strength in the cell thickness direction varies within the same pixel, driving the liquid crystal becomes difficult.

Secondly, when the electrodes are extremely tall, the coverage of layers formed on top of the electrodes is poor and line breakage tends to occur.

Thirdly, in making very small pixels, with extremely tall electrodes it is difficult to make the horizontal direction film thickness thin and obtain a large taper angle.

Consequently, in making very small pixels, to solve the above-mentioned problems, an electrode structure which can be made by a simple method and which also does not produce a noncontinuous electric field has been being sought.

SUMMARY OF THE INVENTION

It is therefore an object of the invention to provide a liquid crystal electro-optic device which has an electrode structure such that noncontinuity of the electric field strength around each pixel electrode is minimized and the display characteristics of the device are thereby improved and which can be made by a simple method.

To achieve this object and other objects, the invention provides a liquid crystal electro-optic device comprising a pair of substrates of which at least one is transparent, electrodes formed on at least one of the substrates, a liquid crystal layer held between the substrates, and electric field impressing means for impressing an electric field on the liquid crystal layer by way of the electrodes, wherein at least one of the electrodes has a curved sectional profile.

The invention also provides a liquid crystal electro-optic device comprising a pair of substrates of which at least one is transparent, electrodes formed on at least one of the substrates, a liquid crystal layer held between the substrates, and electric field impressing means for impressing an electric field on the liquid crystal layer by way of the electrodes, wherein at least one of the electrodes has a semi-circular or semi-elliptical sectional profile.

The invention also provides a liquid crystal electro-optic device comprising a pair of substrates of which at least one is transparent, electrodes formed on at least one of the substrates including an electrode for liquid crystal driving and a common electrode having parts formed in parallel on the same substrate, a liquid crystal layer held between the substrates, and electric field impressing means for impressing an electric field on the liquid crystal layer by way of the electrodes, wherein at least one of the electrodes has a curved sectional profile.

The invention also provides a liquid crystal electro-optic device comprising a pair of substrates of which at least one is transparent, electrodes formed on at least one of the substrates including an electrode for liquid crystal driving and a common electrode having parts formed in parallel on the same substrate, a liquid crystal layer held between the substrates, and electric field impressing means for impressing an electric field on the liquid crystal layer by way of the electrodes, wherein at least one of the electrodes has a semi-circular or semi-elliptical sectional profile.

The invention also provides a liquid crystal electro-optic device comprising a pair of substrates of which at least one is transparent, electrodes formed on at least one of the substrates including an electrode for liquid crystal driving and a common electrode having parts formed in parallel on the same substrate, a liquid crystal layer held between the substrates, and electric field impressing means for impressing an electric field on the liquid crystal layer by way of the electrodes, wherein a nonlinear device is connected to at least one of the electrodes and at least one of the electrodes has a curved sectional profile.

The invention also provides a liquid crystal device comprising a pair of substrates of which at least one is transparent, electrodes formed on at least one of the substrates including an electrode for liquid crystal driving and a common electrode having parts formed in parallel on the same substrate, a liquid crystal layer held between the substrates, and electric field impressing means for impressing an electric field on the liquid crystal layer by way of the electrodes, wherein a nonlinear device is connected to at least one of the electrodes and a peripheral driving circuit for driving a liquid crystal material is formed on at least one of the substrates and at least one of the electrodes has a curved sectional profile.

The invention also provides a liquid crystal electro-optic device comprising a pair of substrates of which at least one is transparent, electrodes formed on at least one of the substrates including an electrode for liquid crystal driving and a common electrode having parts formed in parallel on the same substrate, a liquid crystal layer held between the substrates, and electric field impressing means for impressing an electric field on the liquid crystal layer by way of the electrodes, wherein a nonlinear device is connected to at least one of the electrodes and at least one of the electrodes has a semi-circular or semi-elliptical sectional profile.

The invention also provides a liquid crystal electro-optic device comprising a pair of substrates of which at least one is transparent, electrodes formed on at least one of the substrates including an electrode for liquid crystal driving and a common electrode having parts formed in parallel on the same substrate, a liquid crystal layer held between the substrates, and electric field impressing means for impressing an electric field on the liquid crystal layer by way of the electrodes, wherein a nonlinear device is connected to at least one of the electrodes and a peripheral driving circuit for driving a liquid crystal material is formed on at least one of the substrates and at least one of the electrodes has a semi-circular or semi-elliptical sectional profile.

The invention also provides a liquid crystal electro-optic device comprising a pair of substrates of which at least one is transparent, electrodes formed on at least one of the substrates, a liquid crystal layer held between the substrates, and electric field impressing means for impressing an electric field on the liquid crystal layer by way of the electrodes, wherein at least one of the electrodes has a curved sectional profile and the tangential direction of a line of electric force around the surface of this electrode changes continuously over the entire surface of the electrode.

The invention also provides a liquid crystal electro-optic device comprising a pair of substrates of which at least one is transparent, electrodes formed on at least one of the substrates, a liquid crystal layer held between the substrates, and electric field impressing means for impressing an electric field on the liquid crystal layer by way of the electrodes, wherein at least one of the electrodes has a semi-circular or semi-elliptical sectional profile and the tangential direction of a line of electric force around the surface of this electrode changes continuously over the entire surface of the electrode.

An example of a construction using the invention disclosed in this specification is shown in FIG. 4 and FIG. 5. FIG. 4 is a schematic plan view of a pixel part of an active matrix type liquid crystal electro-optic device wherein nematic liquid crystal is used and this liquid crystal material is driven with a horizontal electric field and a-Si TFTs are used as the driving devices, and FIG. 5 is a sectional view on the line A—A' in FIG. 4.

In the construction shown in FIG. 4 and FIG. 5, 401 denotes first and second substrates, 402 a base $SiO_2$ film, 403 a gate electrode, 404 a common electrode, 405 a gate insulating film, 406 a-Si, 407 a source electrode, 408 a drain electrode, 409 a protective layer, 411 an orienting film, 412 a polarizing plate and 413 a liquid crystal layer.

The liquid crystal electro-optic device of this invention is one wherein a liquid crystal material is operated by controlling the strength of an electric field (a horizontal electric field) between a drain electrode and a common electrode formed on a TFT substrate.

For the above-mentioned first and second substrates, a transparent material having a certain degree of strength with respect to outside forces, for example an inorganic material such as glass or quartz, is used. For the substrate on which the TFTs are formed (hereinafter called the TFT substrate), non-alkali glass or quartz glass is used. When a lightweight liquid crystal electro-optic device is to be made, a film having little birefringence, for example PES (Poly Ethylene Sulfate) or the like also can be used.

As the method by which the liquid crystal material is driven, the multiplex method or the active matrix method may be used.

With the multiplex method, all that need be formed on the first substrate are electrodes for display and reference electrodes, but in the case of the active matrix method, in addition to these a nonlinear device, for example a thin film transistor (TFT) or a diode, is formed for each pixel as a switching device.

As the TFT, a transistor in which amorphous silicon or polysilicon (polycrystalline silicon) is used as an active layer can be used. In the case of the active matrix method, as the construction of the driving device, a known construction such as the stagger type or the reverse stagger type can be used. In the case of a transistor wherein polysilicon is used, it is possible to form a peripheral driving circuit for driving the liquid crystal material on the substrate on which the TFTs are formed. The peripheral driving circuit can be formed in the same process as that by which the TFTs are made. This peripheral driving circuit is made up of complementary devices wherein n-channel and p-channel transistors are combined.

As the device electrodes, Cr, Al, ITO and Ta can be used. The sectional profiles of the electrodes are made smoothly sloping or curved by a method shown below. A sectional profile forming a smoothly sloping surface or a curved surface shown in this specification can be made by a dry process or a wet process. Examples of dry processes include:

(a) methods wherein anisotropic plasma etching and isotropic plasma etching are combined; and (b) methods wherein plasma isotropic etching is carried out using a mask.

As a method of category (a) above, a mask is patterned on a n electrode and anisotropic plasma etching is carried out. The mask is then removed, and resist is coated onto parts not to be isotropically plasma etched. After that, isotropic plasma etching is carried out without a mask on parts to be given a curved sectional profile. In this way, projecting parts are shaved off and it is possible to make an electrode having a smoothly sloping curved sectional profile. After that, the resist is removed. As a method of category (b) above, it is possible to obtain a neat arcuate sectional profile by suitably setting a discharge gas voltage.

In a wet process, on the other hand, as the resist, one whose etching selection ratio is not much different from that of the electrode being etched is used. Also, a resist whose taper angle is somewhat small is used. When this is done, the mask and the electrode being etched are etched by wet etching at about the same rate. In this way, it is possible to make an electrode having a smoothly sloping curved sectional profile with rounded vertices.

The above-mentioned methods are just examples of methods for making electrodes having smoothly sloping curved sectional profiles, and the method by which an electrode having a smoothly sloping curved sectional profile of the invention is made is not limited to these methods.

If one of the electrode materials mentioned above is used, by forming an oxide film of the metal constituting the electrode material on the electrode surface by a method such as anodic oxidation after the curved sectional profile is formed as described above, it is possible to make this an interlayer insulating film. In this way, it is possible to improve interelectrode insulation even in cases of constructions wherein adjacent electrodes or electrode patterns overlap.

Also, it is possible to use silicon oxide ($SiO_2$) or silicon nitride (SiN) as interlayer insulating films and TFT protecting layers.

For the opposing substrate, the same material as that used for the substrate on which the TFTs are formed can be used. Also, although it is not particularly necessary to form any electrodes on the opposing substrate, in some cases electrodes may be formed on all or part of the opposing substrate. As the electrode material in this case, besides the above-mentioned metals, a material having transparency, for example ITO or the like, can be used.

To improve contrast by blocking light from parts not contributing to display, a black matrix (not shown) is formed on the opposing substrate or the TFT substrate or both substrates using a metal such as Cr or a resin material in which a black pigment has been dispersed. Also, in the case of color display, R (red), G (green), B (blue) or C (cyan), M (magenta), Y (yellow) color filters are formed in positions corresponding to respective pixels. As the arrangement of the colors of the color filters, a stripe arrangement or a delta arrangement or the like can be used.

After that, an orienting process is carried out on the substrate on which the driving devices are formed and on the opposing substrate. This orienting process is carried out so that the liquid crystal molecules are parallel with the substrate and oriented uniaxially. As the orienting process, rubbing treatment wherein the substrate surface or the surface of an organic resin film of nylon or polyimide or the like (orienting film) (411) formed on the substrate is rubbed in one direction is effective.

The rubbing direction differs according to the liquid crystal material (413) used, and on the TFT substrate side, in the case of a liquid crystal material whose dielectric constant anisotropy is positive, the rubbing direction is made a direction not parallel to the electric field, and preferably at 45° to the electric field. In the case of a material whose dielectric constant anisotropy is negative, the rubbing direction is made a direction not orthogonal to the electric field, and preferably 45° to the electric field. Rubbing of the opposing substrate side is carried out in a direction parallel or oppositely parallel to the rubbing direction of the TFT substrate.

The pair of substrates thus made are brought face-to-face with each other with a fixed spacing therebetween to form a liquid crystal cell. A sealing agent (not shown) as an adhesive is formed in a predetermined pattern on one of the substrates. As the sealing agent, a resin material hardened thermally or by ultraviolet rays is used. As this resin material, an epoxy or urethane acrylate material can be used. Spacers (not shown) for maintaining the spacing between the two substrates over the whole cell are distributed on the other substrate. After the sealing agent is hardened, the liquid crystal material is injected into the liquid crystal cell by vacuum injection or the like.

Examples of liquid crystal materials which can be used in this invention include nematic, cholesteric and smectic materials, but using a nematic material is particularly preferable. Also, from among nematic liquid crystals, one whose dielectric constant anisotropy is positive or one whose dielectric constant anisotropy is negative is suitably chosen according to the driving method. Also, to reduce the influence of birefringence, a liquid crystal material whose refractive index anisotropy is small is preferable.

In a liquid crystal electro-optic device of the invention, to carry out display utilizing the birefringence of the liquid crystal material, a pair of polarizing plates (412) are arranged with their optical axes intersecting orthogonally and the liquid crystal cell is sandwiched between this pair of polarizing plates. At this time, the orientation direction of the liquid crystal material is parallel with the optical axis of the analyzer, i.e. the polarizing plate nearer the light source.

In a liquid crystal electro-optic device made in this way, the orientation of the liquid crystal material is such that when there is no electric field the long axis of the liquid crystal material is uniaxially oriented in parallel with the substrate and in parallel with the rubbing direction. Then, when an electric field is impressed, the liquid crystal molecules in the vicinities of the orienting film surfaces, which are subject to a strong orientation restricting force, remain parallel with the rubbing direction while the optical axes of the liquid crystal molecules in the vicinity of the middle of the liquid crystal layer, which are only subject to a weak orientation restricting force, are changed by the electric field. When a liquid crystal material whose dielectric constant anisotropy is positive is used, the long axes of the liquid crystal molecules become oriented in parallel with the electric field direction, and when the dielectric constant anisotropy is negative the long axes of the liquid crystal molecules become oriented perpendicular to the electric field direction.

Consequently, with respect to light passing through the liquid crystal electro-optic device, because when there is no electric field the orientation of the liquid crystal material inside the cell is parallel with the optical axis of the analyzer, incident light cannot pass through the polarizer and the amount of light passing through at this time is zero. When an electric field is impressed, on the other hand, the orientation of the optical axis of the liquid crystal material changes and consequently incident light becomes elliptically polarized light and passes through the polarizer.

In the construction described above, two polarizing plates are used, but if a reflecting plate made of metal or the like is formed on one of the two substrates, it is possible to make the liquid crystal electro-optic device using only one polarizing plate, and a bright display can be realized. The metallic reflecting plate can also double as for example a pixel electrode.

When a liquid crystal electro-optic device is constructed according to this invention, compared to electrodes having rectangular or trapezoidal sectional profiles which have been used in conventional liquid crystal electro-optic devices, the electric field around the electrodes is continuous. This continuity of the electric field is clear from the state of lines of electric force around the electrodes when a voltage is impressed on the electrodes. The state of lines of electric force around electrodes will now be described in detail with reference to FIG. 2.

First, for simplicity, a case wherein point charges q1, q2 exist at points $O_1$, $O_2$ will be considered.

Here, the straight line joining $O_1$, $O_2$ will be taken as an x-axis and a direction perpendicular to the x-axis will be made a y-axis. An origin will be defined as the point half-way between the points $O_1$, $O_2$.

A line of electric force passing through any point P as shown in FIG. 2 will be considered. This is in the plane formed by the point P and the points $O_1$, $O_2$.

When this line of electric force is rotated about the $O_1$, $O_2$ axis, a surface of rotation is obtained, and the electric flux passing through any cross-section of this surface of rotation should be constant.

The electric flux passing through a vertical section S passing through P will now be obtained.

If the angles made by the lines $O_1P$ and $O_2P$ and the $O_1O_2$ axis are respectively written $\theta_1$, $\theta_2$, the electric flux $\phi_1$ passing through S due to $q_1$ is:

$$\phi_1 = q_1 \cdot 2\pi(1-cos\theta_1)/4\pi$$

and the electric flux $\phi_2$ passing through S due to $q_2$ is:

$$\phi_2 = q_2 \cdot 2\pi(1-cos\theta_2)/4\pi$$

and therefore the total electric flux $\phi$ passing through S is given by:

$$\phi = \frac{1}{2}\{(q_1+q_2)-(q_1 cos\theta_1 + q_2 cos\theta_2)\}$$

Therefore, on one line of electric force, $$q_1 cos\theta_1 + q_2 cos\theta_2 = \text{constant}$$

If $$q_1 = -q_2,$$

on the line of electric force there is the relationship:

$$cos\theta_1 - cos\theta_2 = \text{constant}$$

Lines of electric force (110) and equipotential surfaces (111) formed by this pair of point charges are shown in FIG. 3.

The distribution of these lines of electric force is the same even if charges the same size as the above-mentioned point charges are distributed on a conducting surface of radius 'a'. Also, in the region $y \geq 0$, it can be approximated to an electric field created by two semi-circular electrodes. Therefore, if the electrode sectional profiles are semi-circular, the distribution of the lines of electric force is continuous with respect to the cell thickness direction.

In the above description, an example wherein the entire sectional profile of the electrode has a circular curvature was shown, but the invention is not limited to this and the same effects can be obtained with an electrode having an elliptical curvature. Also, the sectional profile does not have to form a regular semi-circle, and the same effects can be obtained with a sectional profile forming an arc. The elect rode edge section may have a curved surface of a circular arc shape or the like. An electrode having a sectional profile having a polygonal shape with gentle boundary changes may of course also be used.

Also, films formed on thin films such as electrodes having smoothly sloping curved sectioned profiles have good coverage, because of roundness of the thin films. Therefore, there is also the effect of preventing mixing in of impurities and line breakage caused by poor coverage.

The technique of this invention of making the sectional profile of an electrode curved or smoothly sloping can of course be applied not only to the above-mentioned a-Si type TFTs but also to poly-Si type TFTs.

In particular, when poly-Si is used for the active layer of a TFT, because the carrier mobility of the active layer is larger than when a-Si is used for the active layer and consequently the same characteristics as an a-Si transistor can be obtained with a smaller device region, devices can be made small and therefore a high percentage aperture can be realized. Also, in impressing a horizontal electric field, a higher response speed can be realized when poly-Si, having a large carrier mobility, is used for the TFT active layer. Furthermore, when poly-Si is used, it is possible to also form a peripheral driving circuit for driving the liquid crystal material on the substrate and this contributes to reduction of the number of steps required to manufacture the device, improvement of yield and reduction of the price of the device.

The invention has been discussed above with reference to a liquid crystal electro-optic device of a type wherein a horizontal electric field is impressed on a liquid crystal material; however, the invention is not limited to this and can also be used in a liquid crystal electro-optic device of a type wherein a vertical electric field is impressed on liquid crystal material, for example a conventional TN type or the like, whereby disturbances in the electric field at the ends can be reduced and it is possible to make an electro-optic device having good coverage.

DETAILED DESCRIPTION OF THE PREFERRED EMBODIMENTS

Figure 1:
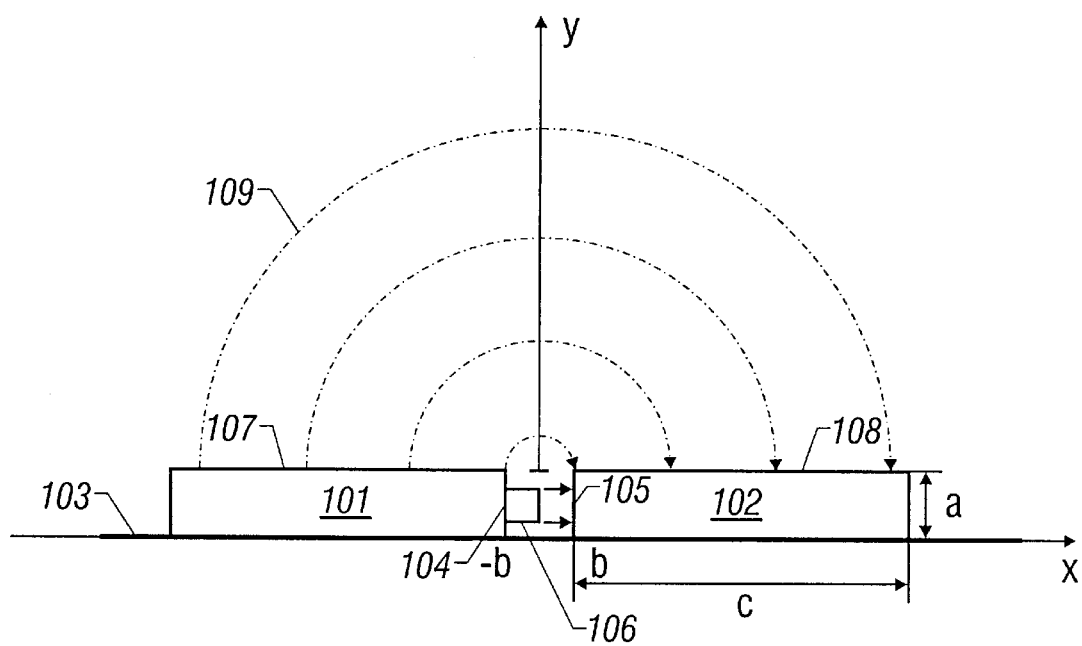
FIG. 1 is a schematic view showing lines of electric force of when an electric field is impressed across electrodes in a conventional liquid crystal electro-optic device.
Figure 2:
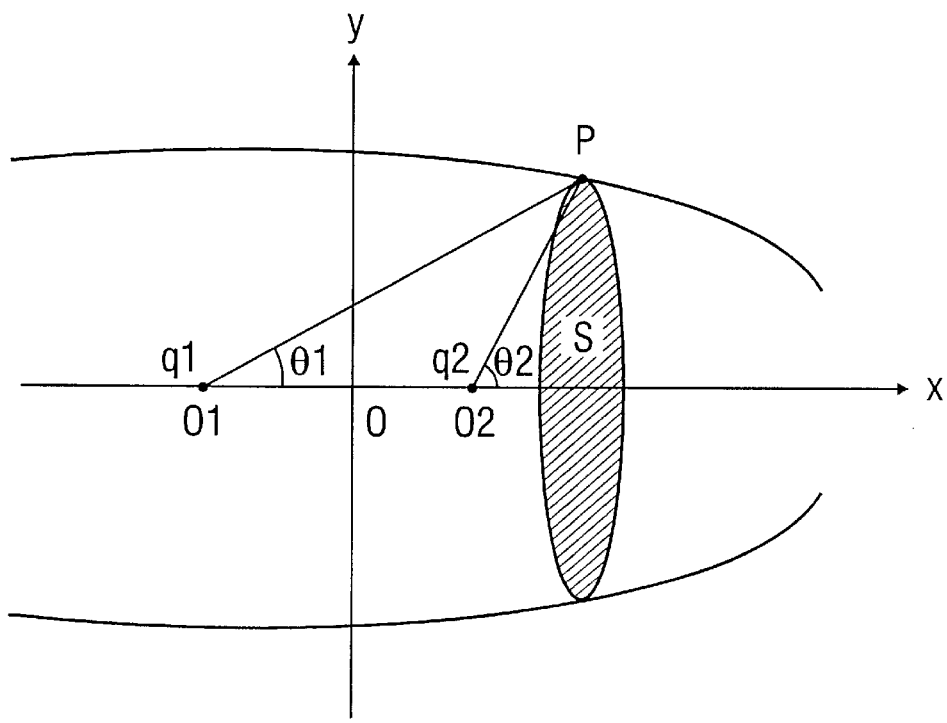
FIG. 2 is a simplified view of lines of electric force and equipotential surfaces formed by two point charges.
Figure 3:
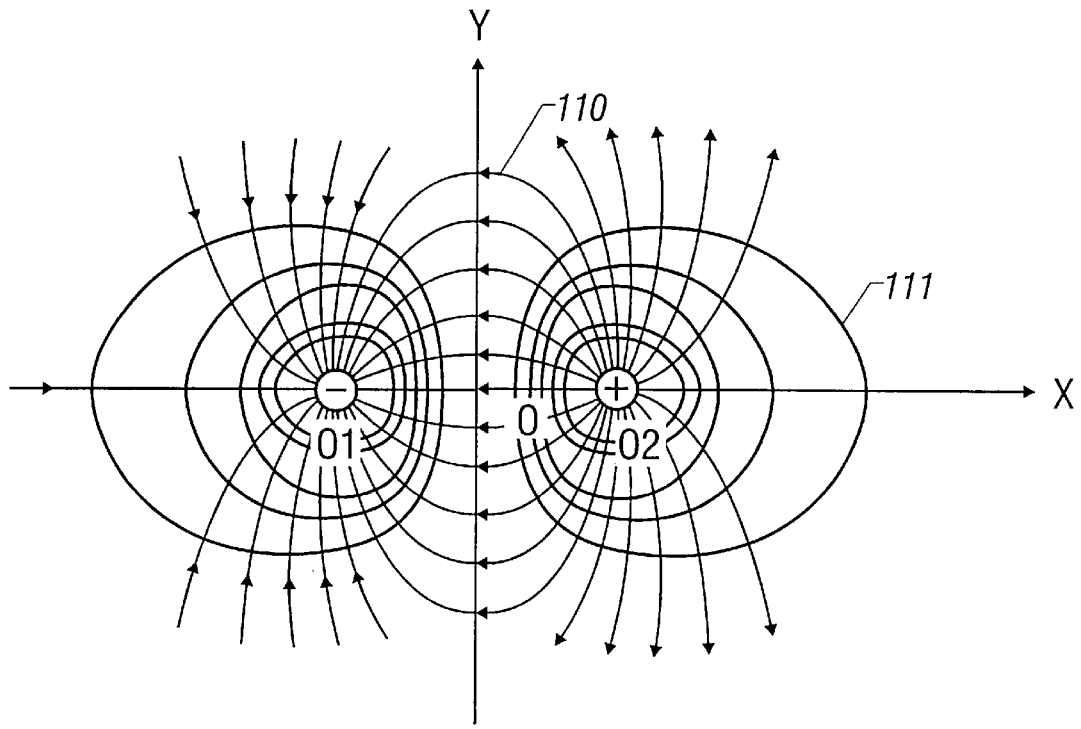
FIG. 3 is a view showing lines of electric force and equipotential surfaces around a pair of electrodes having a curved sectional profile.
Figure 4:
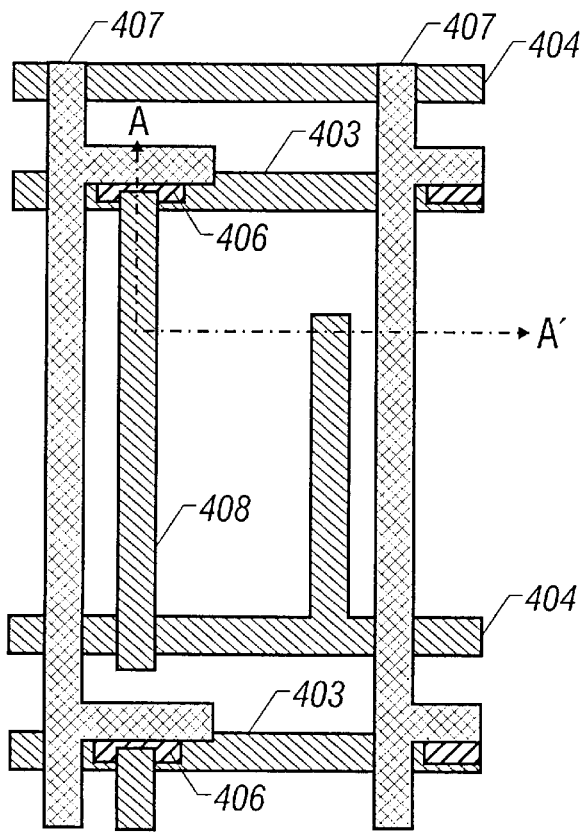
FIG. 4 is a schematic plan view of crystal region of a liquid crystal electro-optic device of a first preferred embodiment of the invention.
Figure 5:
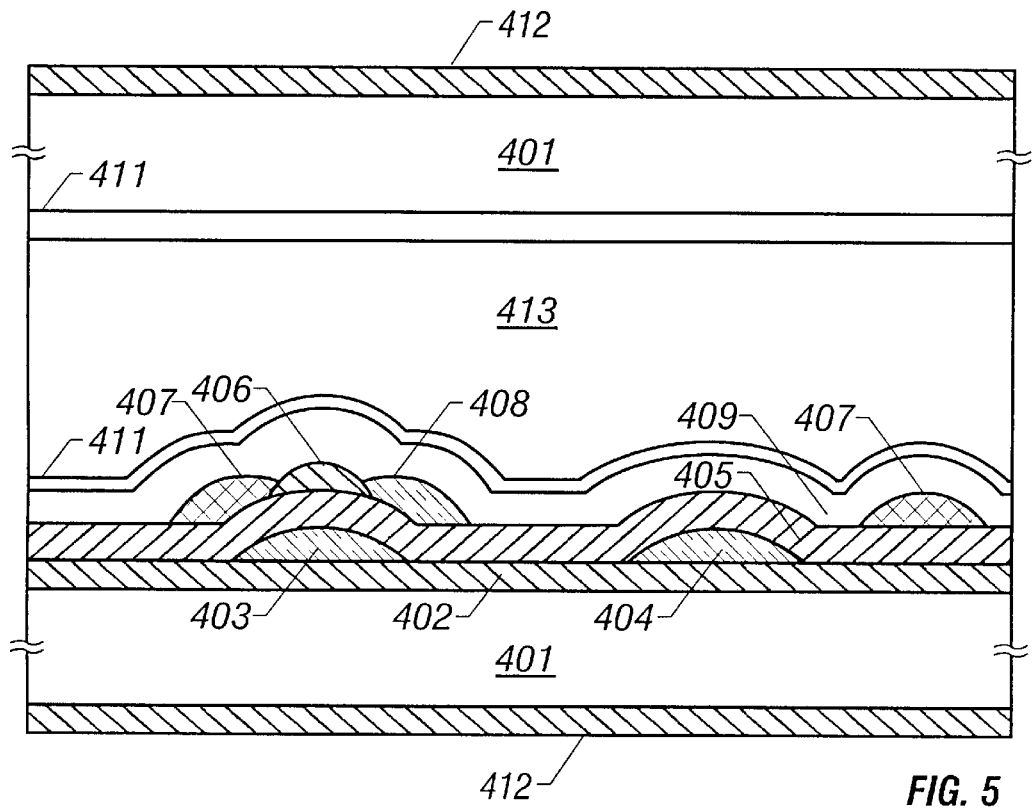
FIG. 5 is a schematic sectional view on the line A–A' in FIG. 4.

Preferred embodiments of the invention will now be described.

(First Preferred Embodiment)

A silicon oxide film of thickness 1000 to 3000 Å was formed as a base oxide film (402) on a Corning #7059 insulating substrate (401). As the method of forming this silicon oxide film, sputtering in an oxygen atmosphere or plasma CVD can be used. A film of Cr was then formed on this to a thickness of 1000 to 5000 Å and patterned. After that, isotropic plasma etching was carried out using resist as a mask. At this time, the discharge gas voltage was suitably set to give the electrodes curved surfaces. In this way, a gate electrode (403) and a common electrode (404) were formed.

A gate insulating film (405) consisting of silicon dioxide ($SiO_2$) was then formed so as to cover these electrodes. This film may alternatively consist of silicon nitride (SiN). An amorphous silicon film (406) was then formed on the gate insulating film above the gate electrode. Then, a source electrode (407) and a drain electrode (408) consisting of Al were formed so as to overlap with parts of the pattern of the amorphous silicon film. At this time, isotropic plasma etching was carried out using resist as a mask, and the discharge gas voltage was suitably set to give the electrodes curved surfaces. A silicon oxide insulating film (409) was then formed as a TFT protecting film. This insulating film may alternatively be an SiN film.

Also, on the opposing substrate or on the TFT substrate or on both substrates, to improve contrast, a black matrix consisting of a metal such as Cr or a resin in which a black pigment is dispersed was formed to block light from parts not participating in display.

After that, an orienting film (411) consisting of polyimide was formed on the substrate on which the TFT was formed and on the opposing substrate. As the orienting film, polyimide was formed by a known spin coating or dipping method. The orienting film surfaces were then rubbed.

The rubbing direction differs according to the liquid crystal material used, and on the TFT substrate side, in the case of a liquid crystal material whose dielectric constant anisotropy is positive, the rubbing direction is made a direction not parallel to the electric field, and preferably at 45° to the electric field. In the case of a material whose dielectric constant anisotropy is negative, the rubbing direction is made a direction not orthogonal to the electric field, and preferably at 45° to the electric field. Rubbing of the opposing substrate side is carried out in a direction parallel or oppositely parallel to the rubbing direction of the TFT substrate.

The TFT substrate and the opposing substrate thus formed were brought face-to-face to form a liquid crystal panel. Spherical spacers of diameter 3 μm were interposed between the two substrates to obtain a uniform substrate spacing over the entire panel. The two substrates were then sealed with an epoxy adhesive to fix them together. The pattern of the sealing was made such that it surrounded the pixel region and a peripheral circuit region. After that, the pair of substrates were cut to a predetermined shape and a liquid crystal material was then injected between them.

Two polarizing plates (412) were then affixed to the outer sides of the substrates. The polarizing plates were so oriented that their optical axes intersected orthogonally and the optical axis of one of the polarizing plates was made parallel with the rubbing direction.

When the optical characteristics of this liquid crystal electro-optic device were measured, good display having less dispersion in rise characteristics than a liquid crystal display having conventional electrode shapes was obtained.

(Second Preferred Embodiment)

Figure 6:
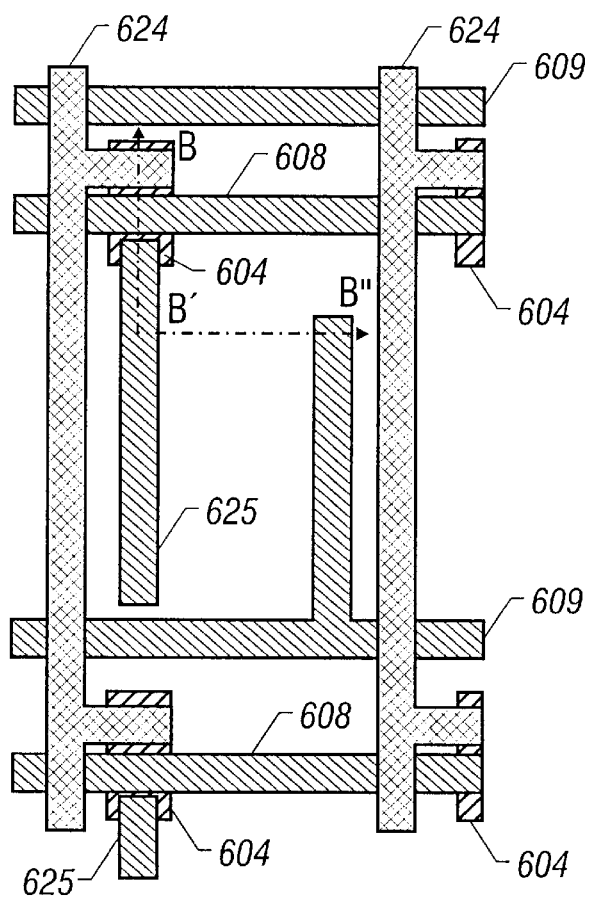
FIG. 6 is a schematic plan view of a pixel region of a liquid crystal electro-optic device of a second preferred embodiment of the invention.
Figure 7A:
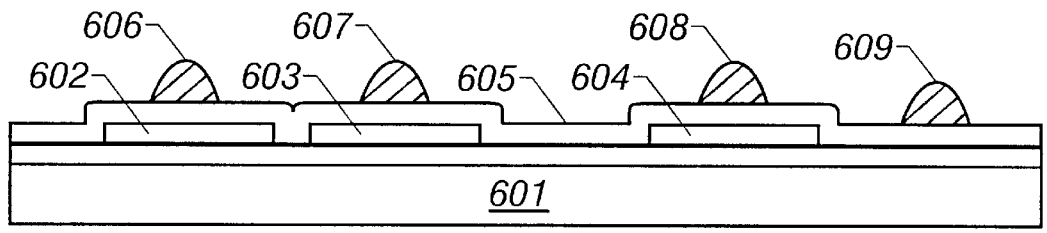
FIGS. 7(A) to 7(E) are schematic sectional views on the line B–B'–B" in FIG. 6 showing the device at different stages in the process of its manufacture.
Figure 7B:
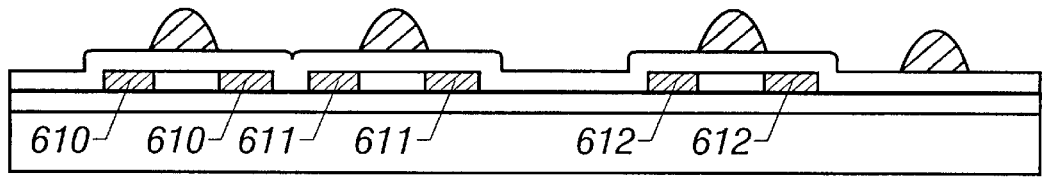
Figure 7C:
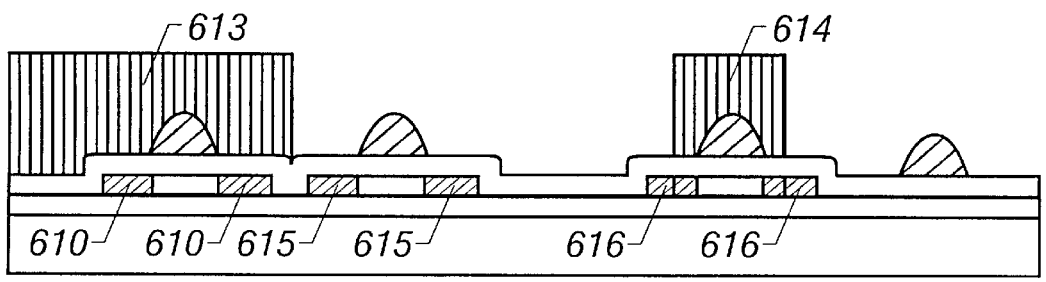
Figure 7D:
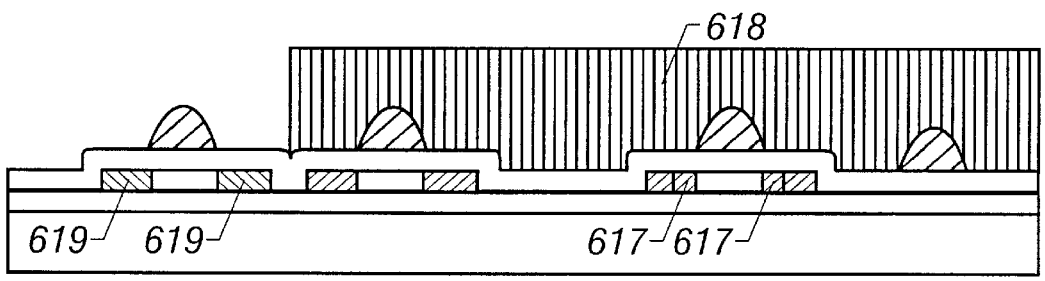
Figure 7E:
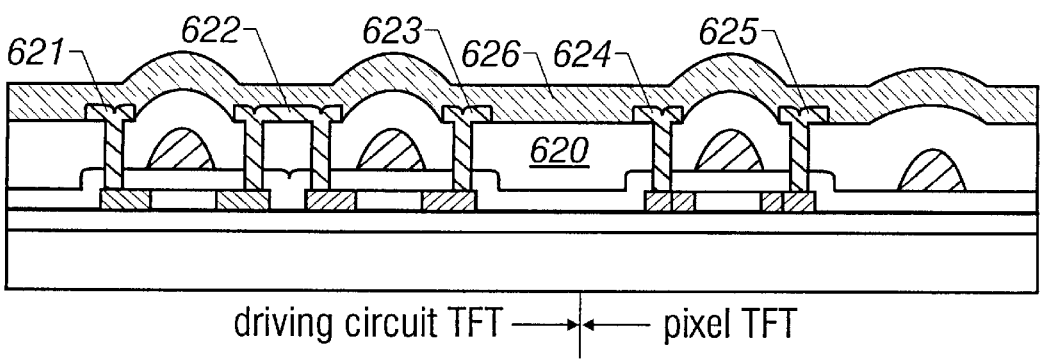

The liquid crystal electro-optic device of this preferred embodiment is a monolithic active matrix circuit wherein a peripheral driving circuit is also formed on the substrate. A process for making the device will be described using FIG. 6 and FIGS. 7(A) to 7(E). FIG. 6 is a schematic plan view of a pixel of this preferred embodiment. FIGS. 7(A) to 7(E) are sectional views on the line B–B'–B" in FIG. 6, a process for manufacturing TFTs of a driving circuit being shown on the left side and a process for manufacturing a TFT of an active matrix circuit being shown on the right side. These processes are low temperature polysilicon processes.

First, a base silicon oxide film (402) was formed on a Corning #1737 first insulating substrate (601). This silicon oxide film may be formed by the same method as that shown in the first preferred embodiment.

After that, an amorphous silicon film was formed to 300 to 1500 Å, and preferably 500 to 1000 Å, by plasma CVD or LPCVD. Thermal annealing was then carried out at a temperature of over 500° C., and preferably 500 to 600° C., whereby the silicon film was crystallized or its crystallinity was raised. After this crystallization by thermal annealing, light (laser or the like) annealing may be carried out to further increase crystallinity. Also, as shown in Japanese Unexamined Patent Publications Nos. H.6-244103 and H.6-244104, at the time of crystallization by thermal annealing, an element such as nickel or the like which promotes the crystallization of silicon (a catalyst element) may be added.

The silicon film was then etched to form island-shaped active layers (602) (for a P-channel type TFT) and (603) (for an N-channel type TFT) of the TFTs of the driving circuit and an active layer (604) of the TFT of the matrix circuit (a pixel TFT). Also, a silicon oxide gate insulating film (605) of thickness 500 to 2000 Å was formed by sputtering in an oxygen atmosphere. As the method of forming the gate insulating film, plasma CVD may alternatively be used. When forming a silicon oxide film by plasma CVD, as the raw material gas, using nitrogen monoxide ($N_2O$) or oxygen ($O_2$) and monosilane ($SiH_4$) was preferable.

After that, aluminum of thickness 2000 to 6000 Å was formed by sputtering over the entire surface of the substrate. Here, to prevent hillocks forming in a subsequent heating process, aluminum containing silicon or scandium or palladium or the like may be used. Then, gate electrodes (606, 607, 608) and a common electrode (609) were formed by isotropic plasma etching (FIG. 7(A)). At this time, the discharge gas voltage was suitably set to give the electrodes curved surfaces. After that, by ion doping, utilizing self-alignment with the gate electrodes (606, 607, 608) as masks, with phosphine ($PH_3$) as the doping gas, phosphorus was doped into all the island-shaped active layers. The dose amount was $1\times10^{12}$ to $5\times10^{13}$ atoms/cm$^2$.

As a result, weak N-type regions (610, 611, 612) were formed. (FIG. 7(B)).

Next, a photoresist mask (613) covering the P-channel type active layer (602) and a photoresist mask (614) covering the active layer (604) of the pixel TFT as far as 3 μm from the ends of the gate electrode (608) in parallel with the gate electrode were formed.

Then, phosphorus was again injected by ion doping with phosphine as the doping gas. The dose amount was $1\times10^{14}$ to $5\times10^{15}$ atoms/cm$^2$. As a result of this, strong N-type regions (source and drain) (615, 616) were formed. The region (617) covered by the photoresist mask (614) on the pixel TFT remained weak N-type because no phosphorus was injected into it in this doping. (FIG. 7(C)).

Next, the N-channel type active layers (603, 604) were covered with a photoresist mask (618), and boron was injected into the island-shaped region (602) by ion doping with diborane ($B_2H_6$) as the doping gas. The dose amount was $5\times10^{14}$ to $8\times10^{15}$ atoms/cm$^2$. In this doping, because the dose amount of boron is greater than the dose amount of phosphorus in FIG. 7(C), the previously formed weak N-type region (610) inverts into a strong P-type region (619).

By the doping described above, strong N-type regions (source/drain) (615, 616), a strong P-type region (source/drain) (619) and a weak N-type region (low concentration impurity region) (617) were formed. (FIG. 7(D))

After that, by carrying out thermal annealing at 450° to 850° C. for 0.5 to 3 hours, damage caused by the doping was repaired, the doped impurities were activated and the crystallinity of the silicon was restored. After that, a silicon oxide film was formed over the entire surface as an interlayer insulating film (620) to a thickness of 3000 to 6000Å by plasma CVD. This may alternatively be a silicon nitride film or a multiple layer film comprising a silicon oxide film and a silicon nitride film. The interlayer insulating film (620) was etched by wet etching or dry etching to form contact holes above the source and drain regions.

Then, an aluminum film or a multiple layer film comprising titanium and aluminum of thickness 2000 to 6000Å was formed by sputtering. This was then isotropically plasma etched using resist as a mask. At this time, the discharge gas voltage was suitably set to give the electrodes curved surfaces, and electrodes/interconnections (621, 622, 623) of the peripheral circuit and electrodes/interconnections (624, 625) of the pixel TFT were formed.

Also, a silicon nitride film (626) of thickness 1000 to 3000 Å was formed as an interlayer film by plasma CVD. (FIG. 7(E))

Thereafter, by the same method as in the first preferred embodiment, a liquid crystal cell was made. Here, the pattern of the seal was made such that it enclosed the pixel region and the peripheral driving circuit region. Also, after that, polarizing plates were affixed to the pair of substrates as in the first preferred embodiment to complete the liquid crystal electro-optic device.

When the optical characteristics of this liquid crystal electro-optic device were measured, good display having less dispersion in rise characteristics than a liquid crystal display having conventional electrode shapes was obtained.

With the construction of this preferred embodiment, because the driving circuit is made on the same substrate as the pixel TFT, there is the merit that the manufacturing cost is low.

As described above, with this invention it is possible to obtain with a simple manufacturing process a liquid crystal electro-optic device whose liquid crystal rise characteristics are better than those of a conventional horizontal electric field drive type liquid crystal electro-optic device. The invention also allows pixel size reduction.

What is claimed is:

1. A liquid crystal electro-optical device comprising:
   a pair of substrates opposed to each other, at least one of said substrates being transparent;
   a liquid crystal layer held between the substrates; and
   a pair of electrodes commonly supported by only one of said pair of substrates for inducing an electric field therebetween;
   wherein at least one of the electrodes has a curved sectional profile.

2. A liquid crystal electro-optic device comprising:
   a pair of substrates opposed to each other, at least one of said substrates being transparent;
   a liquid crystal layer held between the substrates; and
   a pair of electrodes commonly supported by only one of said pair of substrates for inducing an electric field therebetween;
   wherein at least one of the electrodes has a semi-circular or semi-elliptical sectional profile.

3. A liquid crystal electro-optic device comprising:
   a pair of substrates opposed to each other, at least one of said substrates being transparent;

a pixel electrode and a common electrode commonly formed over only one of said substrates for inducing an electric field therebetween wherein said pixel electrode and said common electrode extend in parallel to each other at least partly; and a liquid crystal layer held between the substrates;

wherein at least one of the electrodes has a curved sectional profile.

4. A liquid crystal electro-optic device comprising:

a pair of substrates opposed to each other, at least one of said substrates being transparent;

a pixel electrode and a common electrode commonly formed over only one of said substrates for inducing an electric field therebetween wherein said pixel electrode and said common electrode extend in parallel to each other at least partly; and a liquid crystal layer held between the substrates;

wherein at least one of the electrodes has a semi-circular or semi-elliptical sectional profile.

5. A liquid crystal electro-optic device comprising:

a pair of substrates opposed to each other, at least one of said substrates being transparent;

a pixel electrode and a common electrode commonly formed over only one of said substrates for inducing an electrical field therebetween wherein said pixel electrode and said common electrode extend in parallel to each other at least partly;

a nonlinear device connected to said pixel electrode for switching said pixel electrode; and a liquid crystal layer held between the substrates;

wherein at least one of the electrodes has a curved sectional profile.

6. A liquid crystal electro-optic device according to claim 5, wherein the nonlinear device is a thin film transistor.

7. A liquid crystal electro-optic device comprising:

a pair of substrates opposed to each other, at least one of said substrates being transparent;

a pixel electrode and a common electrode commonly formed over only one of said substrates for inducing an electric field therebetween wherein said pixel electrode and said common electrode extend in parallel to each other at least partly;

a nonlinear device connected to said pixel electrode for switching said pixel electrode;

a peripheral driving circuit formed over one of said substrates for driving said nonlinear device; and a liquid crystal layer held between the substrates;

wherein a nonlinear device is connected to at least one of the electrodes and a peripheral driving circuit for driving a liquid crystal material is formed on at least one of the substrates and at least one of the electrodes has a curved sectional profile.

8. A liquid crystal electro-optic device according to claim 7, wherein the nonlinear device is a thin film transistor.

9. A liquid crystal electro-optic device according to claim 7, wherein the peripheral driving circuit comprises a complementary device.

10. A liquid crystal electro-optic device comprising:

a pair of substrates opposed to each other, at least one of said substrates being transparent;

a pixel electrode and a common electrode commonly formed over only one of said substrates for inducing an electric field therebetween wherein said pixel electrode and said common electrode extend in parallel to each other at least partly;

a nonlinear device connected to said pixel electrode for switching said pixel electrode; and a liquid crystal layer held between the substrates;

wherein at least one of the electrodes has a semi-circular or semi-elliptical sectional profile.

11. A liquid crystal electro-optic device according to claim 10, wherein the nonlinear device is a thin film transistor.

12. A liquid crystal electro-optic device comprising:

a pair of substrates opposed to each other, at least one of said substrates being transparent;

a pixel electrode and a common electrode commonly formed over only one of said substrates for inducing an electric field therebetween wherein said pixel electrode and said common electrode extend in parallel to each other at least partly;

a liquid crystal layer held between the substrates;

a nonlinear device connected to said pixel electrode for switching said pixel electrode; and a peripheral driving circuit formed over one of said substrates for driving said nonlinear device; and wherein at least one of the electrodes has a semi-circular or semi-elliptical sectional profile.

13. A liquid crystal electro-optic device according to claim 12, wherein the nonlinear device is a thin film transistor.

14. A liquid crystal electro-optic device according to claim 12, wherein the peripheral driving circuit comprises a complementary device.

15. A liquid crystal electro-optic device comprising:

a pair of substrates opposed to each other, at least one of said substrates being transparent;

a pixel electrode and a common electrode commonly formed over only one of said substrates for inducing an electric field therebetween wherein said pixel electrode and said common electrode extend in parallel to each other at least partly;

a liquid crystal layer held between the substrates;

wherein at least one of the electrodes has a curved sectional profile and the tangential direction of a line of electrical force around the surface of this electrode changes continuously over the entire surface of the electrode.

16. A liquid crystal electro-optic device comprising:

a pair of substrates opposed to each other, at least one of said substrates being transparent;

a pixel electrode and a common electrode commonly formed over only one of said substrates for inducing an electric field therebetween wherein said pixel electrode and said common electrode extend in parallel to each other at least partly;

a liquid crystal layer held between the substrates;

wherein at least one of the electrodes has a semi-circular or semi-elliptical sectional profile and the tangential direction of a line of electric force around the surface of this electrode changes continuously over the entire surface of the electrode.

* * * * *